April 29, 1952 R. R. FREUND ET AL 2,594,762
FLUID DISTRIBUTION SYSTEM
Filed Dec. 26, 1945
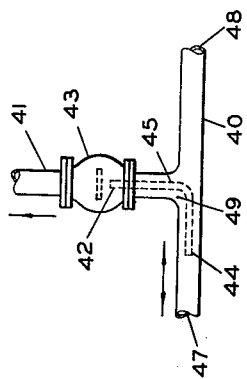
FIG. 2
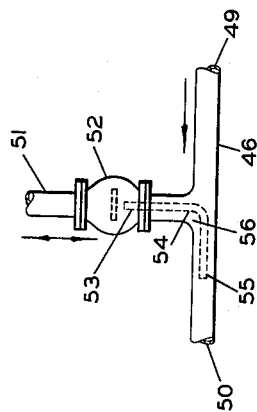
FIG. 3
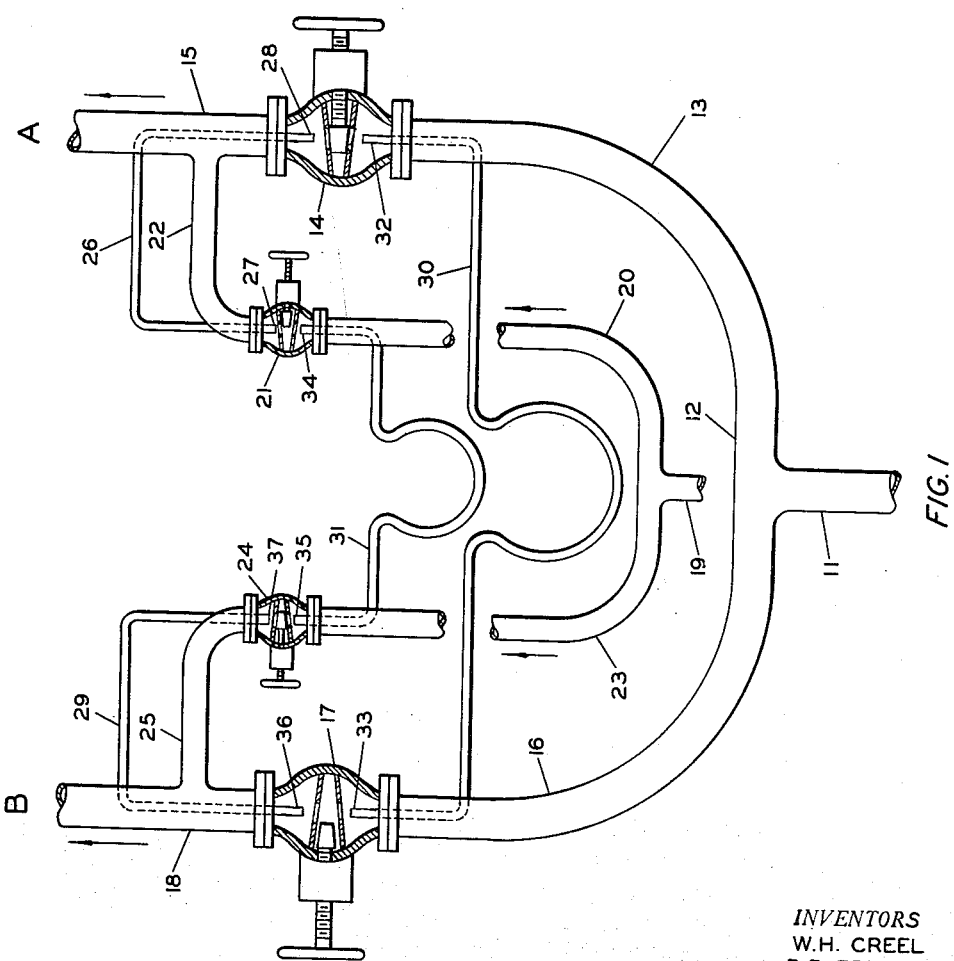
FIG. I
INVENTORS
W.H. CREEL
R.R. FREUND
BY Hudson & Young
ATTORNEYS Patented Apr. 29, 1952

2,594,762

UNITED STATES PATENT OFFICE 2,594,762

FLUID DISTRIBUTION SYSTEM

Robert R. Freund, Mexico City, Mexico, and William H. Creel, Bartlesville, Okla., assignors to Phillips Petroleum Company, a corporation of Delaware Application December 26, 1945, Serial No. 637,166

6 Claims. (Cl. 137—78)

1

This invention relates to a fluid distribution system. In one of its more specific aspects it relates to a system for heating and maintaining in a heated condition closed valves which when open are in high temperature service.

The wide application of cyclic hydrocarbon processing has introduced many new problems to the industry. Such problems have, in many high temperature operations become acute. Valves controlling the flow of high temperature fluids become heated to approximately the temperature of the fluid. When such valves are closed and the source of heat removed therefrom cooling occurs. This cooling is relatively rapid at first but becomes slower as the valve temperature comes nearer to that of the atmosphere. Then, when hot fluid, at say 1000° F. is again flowed through the valve, this latter then is very rapidly heated. Such rapid heating and rapid and/or slow cooling, in cyclic operations, usually cause cracking in valve bodies and ultimate destruction thereof. To replace valve bodies at frequent intervals is a costly procedure.

We have devised an apparatus wherein a valve in cyclic high temperature survice is maintained hot while in a closed condition. Valves accordingly when opened to the flow of high temperature fluid do not experience such a severe thermal shock and valve bodies have a much longer normal life.

One object of our invention is to devise a method for increasing the life of valve bodies used in cyclic high temperature service.

Another object of our invention is to provide means wherein a valve in cyclic high temperature service can be maintained hot while closed to the flow of hot fluid.

Still another object of our invention is to provide means for reducing thermal shock to a valve in cyclic high temperature service when the valve is first opened to the flow of hot fluid.

Many other objects and advantages will be apparent to those skilled in the art from a careful study of the following description which taken with the attached drawing form a part of this specification.

Figure 1 of the drawing illustrates one embodiment of our valve heating system.

Figure 2 illustrates another embodiment of our invention.

Figure 3 illustrates still another embodiment of the principles of our invention.

Referring now to the drawing and specifically to Figure 1, hot fluid to be processed from a source, not shown, enters our system through a transfer line 11. The system illustrated in this figure is intended to be a 2-unit system, for example, a catalytic conversion system having two catalyst chambers, one to be on regeneration while the other is on process. The transfer line 11, as mentioned, brings hot fluid, as a vaporized gas oil to be cracked, from a heater or other source, to a manifold point 12 which when a unit A is on stream allows passage of the hot fluid through a branch line 13, a valve 14, a feeder line 15, and thence on to a conversion chamber, not shown, or to a unit as designated by the letter A. From the main transfer line 11, a second branch line 16, a valve 17, and a feeder line 18, hot fluid flows to a second conversion or other high temperature processing unit B. Since catalytic conversion processes experience a gradual degradation of catalyst activity occasioned by deposition of carbonaceous matter upon the catalyst and this carbonaceous matter is usually removed by oxidation with air, a pipe 19 brings hot air suitable for this oxidation, from a source, not shown. This hot regeneration air or gas as it is frequently termed passes through a branch line 20, a valve 21, and a pipe 22 into the feeder line 15 for passage to the unit A when on regeneration. In like manner when unit B is on regeneration, the hot regeneration gas passes from the main line 19 through a branch line 23, a valve 24 and a tube 25 into the feeder line 18.

When such a 2-unit system is in operation, and unit A "on process" and unit B "on regeneration," valve 14 is open so that hot fluid feed passes from the transfer line 11 through the branch line 13, valve 14 and feeder line 15 into the processing unit A. Valve 21 is of course closed so that oxidizing gas cannot pass. However, valve 24 is open for the passage of hot regeneration gas to unit B while valve 17 is closed.

While hot feed stock is passing through the valve 14, the valve body and all parts of the valve are hot. Upon closing valve 14 to the flow of hot fluid, the valve body cools, with the rate of cooling depending upon the insulation provided, and not shown in the drawing for purposes of simplicity. In any event, the rate of cooling is slow. When such a valve remains closed for periods of 2 to 8 hours, even when insulated, the temperature frequently drops to as low as 300° to 400° F. Then, following this cooling period, when hot charge fluid at say 950° F. is abruptly passed through this valve excessive thermal strains are set up and these ultimately result in the formation of cracks in the valve body. By continued use the cracks grow larger and more form until either the body fails or is removed from service prior to failure and accident.

We have devised a very simple means for keeping this valve 14 hot while it is closed to the flow of hot fluid. We merely install a small diameter heater tube 26 as shown, one end 27 extending through the pipe 22, and the other end 28 extending through the feeder pipe 15 to points close to the respective valves 21 and 14. While valve 14 is closed and valve 21 is open, and hot regeneration gas is passing through the valve 21, pipe 22 into the feeder line 15, some of this hot regeneration gas passes into the open end 27 of the heater pipe 26 and out the opposite end 28 adjacent the closed valve member of valve 14. In this manner some hot regeneration gas is continuously contacting the downstream side of the closure member of valve 14 and by addition of heat at this point the interior of this valve is kept relatively hot. Then following the regeneration period when valve 21 is closed and the hot regeneration gas no longer passes through the heater tube 26, air is flushed through these pipes for purging purposes, from a source and through pipes and fittings not shown. Following this purging step, hot fluid for processing is permitted to flow by opening the valve 14. Since the interior of this valve was kept hot during the time it was "closed," its opening did not cause such a great temperature change in the valve body, and accordingly less marked thermal effects.

When the valve 14 is open and valve 21 is closed hot fluid for processing flows into the heater tube 26 at its open end 28 and out of same at the other end 27. In this manner the valve 21 is kept hot during the time it is closed to the flow of hot regeneration gas.

In like manner another heater tube 29 having one open end within the body of the valve 17 and the other open end in the body of valve 24, furnishes hot fluid to the downstream side of valve 24 and hot regeneration gas to the downstream side of valve 17.

We have found that these valves can be maintained at a still higher temperature by the installation of two additional heater pipes 30 and 31, as shown in Figure 1. The heater pipe 30 has an open end 32 at the upstream side of the closure member of valve 14 and well within the valve body. The other end 33 of this heater pipe 30 is located just upstream of the closure member of valve 17.

The heater tube 31 has open ends 34 and 35, terminating on the upstream side of the closure members of valves 21 and 24, respectively.

Referring now to the operation of the heater tube 30 when the valve 17 is open (unit B on process), valve 14 is closed and the regeneration gas valve 21 is open. Under these conditions processing fluid does not flow through valve 14 but hot regenerating gas passing through valve 21 is in part passed through the heater tube 26 to keep the downstream side of the closure member of valve 14 and the valve body of this valve in a heated condition. Since valve 17 is open fluid passing therethrough causes a suction effect at the open end 33 of the heater pipe 30. This suction causes a movement of fluid from the open end 32 of heater pipe 30 to the suction end 33. This operation then permits the flow of some hot processing fluid through the branch line 13 to the upstream side of the closure member of valve 14. This hot fluid at the upstream side of this valve closure member supplemented by the presence of hot regeneration gas from the tube opening 28 at the downstream side of said closure member keeps the valve body of valve 14 in a well heated condition so that when this valve is opened only a minimum of thermal effect is experienced.

In like manner, when valve 17 is closed, valve 24 is open and valve 14 is open, hot regeneration gas from tube opening 36 and hot processing fluid from tube opening 33 maintain the valve 17 in a well heated condition.

The valves 21 and 24 with the heater tube 31 operate in a similar manner as do valves 14 and 17 with the heater tube 30. When valve 24 is open to the flow of hot regeneration gases the end 35 of the heater tube 31 becomes exposed to a suction effect and hot gases enter this tube at opening 34 thus maintaining a small flow of hot gases through the branch line 20 and maintaining the upstream side of the closure member of valve 21 hot. At the same time valve 14 being open hot fluid for process passes from point 28 through tube 26 to opening 27 to furnish heat to the downstream side of said valve 21. Both sides of valve 21 are thus heated while in a closed position. In a similar manner valve 24 is heated on both sides from the flow of hot regeneration gas from point 35 through tube 31 to point 34 while hot fluid for process flows into tube 29 at opening 36 and out at open end 37.

Figure 2 illustrates another embodiment of our invention wherein only one fluid passes through a header line having side take-off valves and the header line adapted to the flow of fluid in either direction. A main header line 40 is adapted to carry hot fluid in either direction and has, for illustrative purposes, one take-off side line 41, having a valve. When hot fluid is flowing from point 47 to point 48, and valve 43 is closed, then hot fluid passes through the heater tube 45 to be conducted into the valve body at a point near the valve closure member. The fluid flowing through heater 45 into the body part of valve 43 flows back into the main header stream at point 49, and in making this circuit adds heat to at least one side of the valve 43. In a similar manner when header fluid flow in line 40 is from point 48 toward point 47, then the end of the heater tube 45 which extends into the direct fluid flow becomes a suction point and causes flow of fluid from the line past point 49 and through the body portion of valve 43 and into the end 42 of heater tube 45 to be delivered to the suction point 44. This hot fluid continuously passes through one side of the body of valve 43 regardless of the direction of flow of hot fluid in the header line.

Figure 3 shows an installation (similar to that of Figure 2) but adapted to two-way fluid flow through the take-off side line. A main header line 46 carries hot fluid from point 49 to point 50. The side take-off line 51 may convey fluid into or out of the heater line 46. When a take-off valve 52 is closed, then fluid passes opening 56, enters heater pipe opening 53 and flows through this heater pipe 54 and is discharged back into the header line stream at a suction point 55. This hot liquid is continuously flowed through one side of the body of the valve 52. Obviously the disposition of the heater tube 54 is not adapted for the flow of fluid from take-off pipe 51 and from point 50 toward point 49 at the same time since any flow from point 50 into the heater tube 54 at inlet point 55 would tend to obstruct flow from the take-off line 51 into the header line 46, but such flow is possible if desired.

As an illustration of the utility of our valve heating apparatus the following is to the point: When a catalytic cracking 2-chamber unit was used in normal cyclic operation without installation of such heater pipes as 31 and 30 of Figure 1, the valves 21 and 24 had to be repaired and at times replaced each time the unit was down due to valve body cracking to a point considered unsafe. When the heater pipes were installed valve body cracking was absent.

One valve body without heater pipes and in the regeneration gas line (valve 24) when closed during an "on stream" period cooled to 369° F.

Upon opening to the flow of regeneration gases at 900° F. the valve was immediately exposed to a temperature increase from 369° F. to 900° F., totalling 531° temperature differential. Under such temperature change conditions the valve body had to be removed from service when the unit came down for repairs. When heater tubes were installed a valve in this same location (24) cooled to only 701° F. when closed. Then upon opening to 900° F. regeneration gases the temperature increase was only 199° F. which was sufficiently small as to cause no cracking from resulting metal expansion. This valve was in service through a number of operational periods with the development of substantially no cracks at all.

The material of construction of our heater tubes may be similar to that used in the pipes into which the heater tubes are welded. While other material may be used as long as they can withstand the temperatures, corrosion, etc., we prefer to use materials similar to that used in the main pipes of the catalytic system. For example, heater tube 31 may be of the same material as are pipes 19, 20 and 23, and heater tube 30 may be of the same material as used for making pipes 11, 13 and 16.

While we have described our invention as adapted to a 2-vessel catalytic system, it will be obvious to those skilled in the art that our broad idea may be adapted to catalyst systems employing three or more catalyst chambers. In such combinations two vessels may be on regeneration with one on process, or in a four chamber system three may be on regeneration with one on process or two-and-two or any other combination. Our invention has a wide application and may be used in many installations wherein the closed valves cool and when opened to the flow of high temperature fluid ultimately fail due to such thermal changes.

Having described our invention, we claim:

1. In a hot fluid distribution system, a main conduit, a branch conduit having a valve therein, and a relatively small auxiliary conduit positioned inside said other conduits, said auxiliary conduit having a portion extending into said branch conduit to a position adjacent said valve and another portion concentric with and extending axially into said main conduit so arranged that flow of fluid through said main conduit produces a secondary circulation of fluid through said auxiliary conduit.

2. In a hot fluid distribution system, a main conduit, a pair of branch conduits each having a valve therein, and a relatively small auxiliary conduit interconnecting said branch conduits, each end of said auxiliary conduit having a discharge opening adjacent one of said valves, the end portion of said conduit adjacent each discharge opening being constructed and arranged so that flow of fluid through the adjacent branch conduit creates a suction effect at the discharge opening tending to establish a secondary circulatory flow through the other branch conduit and said auxiliary conduit.

3. In a hot fluid distribution system, a main conduit, a pair of branch conduits each having a valve therein, and a relatively small auxiliary conduit interconnecting said branch conduits, each end of said auxiliary conduit having a discharge portion extending along the direction of fluid flow in a branch conduit with a discharge opening adjacent one of said valves, whereby flow of fluid in one branch conduit creates a suction effect at the associated discharge opening tending to establish a secondary circulatory flow through the other branch conduit and said auxiliary conduit.

4. In a hot fluid distribution system, a pair of branch conduits each having a valve therein, a main conduit for supplying fluid to the upstream part of said branch conduits, a pair of pipes joined to the respective downstream parts of said branch conduits, a valve in each of said pipes, a line connecting the downstream part of each pipe valve with the downstream part of the associated conduit valve, a line interconnecting the upstream parts of said pipe valves, and a line interconnecting the upstream parts of said conduit valves, all of said lines having axially disposed end portions facing toward the valves adjacent thereto, respectively, whereby secondary circulatory systems are provided for circulating fluid past the upstream and downstream parts of each valve.

5. In a hot fluid distribution system, a main conduit, a pair of branch conduits each having a valve therein, a relatively small auxiliary conduit interconnecting the upstream parts of said valves and having discharge portions extending in the direction of fluid flow in the respective branch conduits, said discharge portions terminating near the respective adjacent valves, a pair of pipes connected to the respective downstream parts of said branch conduits, each pipe having a valve therein, a second auxiliary conduit interconnecting the upstream parts of said pipe valves and having discharge portions extending along the direction of fluid flow in the respective pipes said discharge portions terminating adjacent the respective pipe valves, and a second set of auxiliary conduits connecting the downstream part of each pipe valve with the downstream part of the associated branch conduit valve, said second set of auxiliary conduits terminating at their respective adjacent valves whereby secondary circulatory flows are established through said pipes and conduits for supplying fluid to the upstream and downstream parts of each closed valve.

6. In a fluid distribution system, a first conduit having a valve therein, a branch conduit, and a relatively small auxiliary conduit having one end thereof positioned in said branch conduit and concentric therewith so that flow of fluid through said branch conduit produces a secondary circulation in said auxiliary conduit, the other end of said auxiliary conduit being positioned within said first conduit adjacent said valve.

ROBERT R. FREUND.
WILLIAM H. CREEL.

REFERENCES CITED

The following references are of record in the file of this patent:

UNITED STATES PATENTS

| Number | Name | Date |
| --- | --- | --- |
| 171,116 | Folliard | Dec. 14, 1875 |
| 186,411 | Church | Jan. 23, 1877 |
| 255,509 | Hooker | Mar. 28, 1882 |
| 822,920 | Callaghan | June 12, 1906 |
| 1,701,500 | Keith | Feb. 12, 1929 |
| 1,958,228 | Beardsley | May 1, 1931 |
| 2,062,246 | Atkinson | Apr. 28, 1936 |
| 2,084,397 | Hildebrandt | June 22, 1937 |
| 2,270,365 | Wilson | Jan. 20, 1942 |
| 2,445,414 | Zabriskie | July 20, 1948 |